April 14, 1964     H. H. MONK     3,128,838
BATHROOM SCALE
Filed Feb. 12, 1962
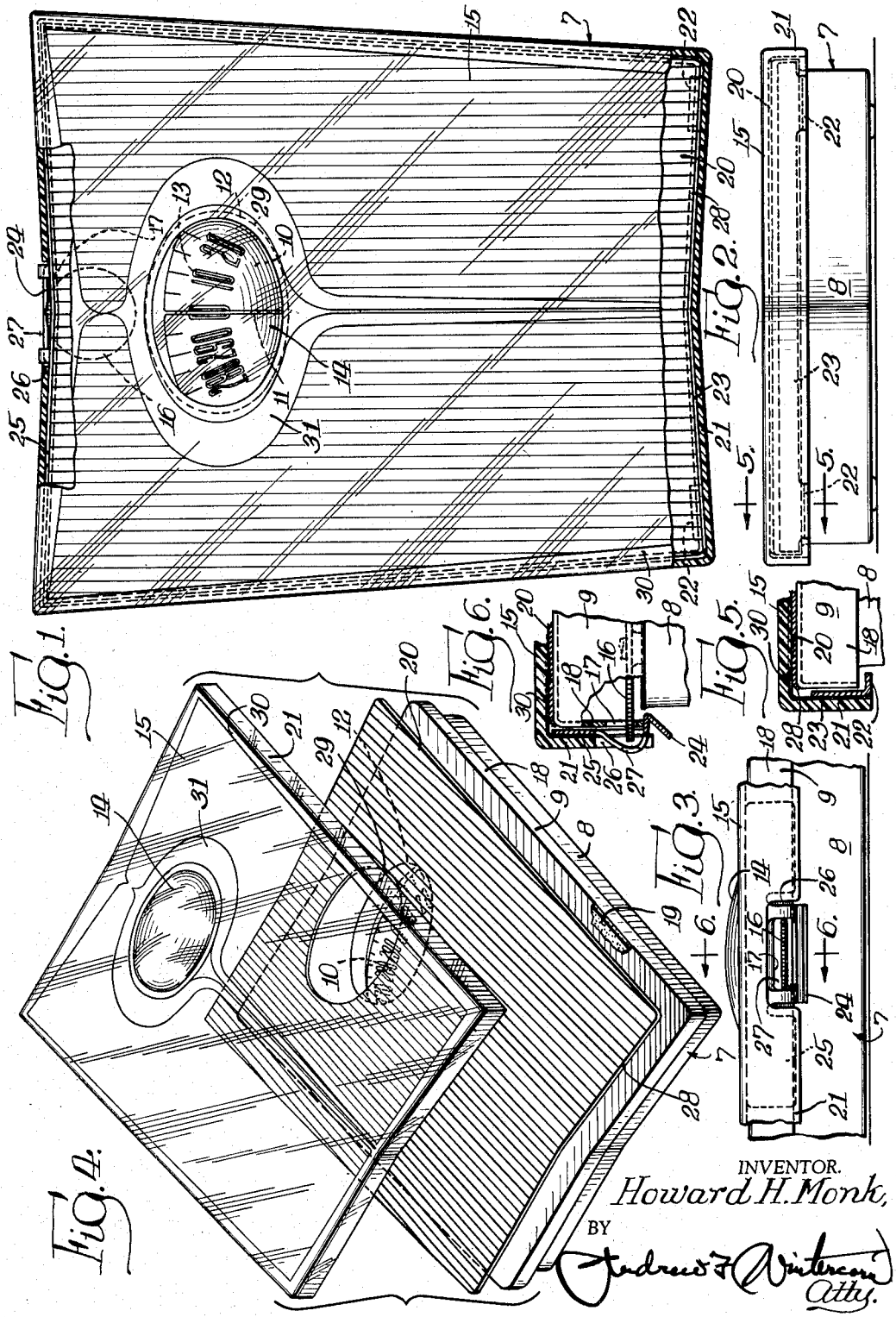
INVENTOR.
Howard H. Monk, United States Patent Office 3,128,838
Patented Apr. 14, 1964

3,128,838
BATHROOM SCALE
Howard H. Monk, Rockford, Ill., assignor to The Brearley Company, Rockford, Ill., a corporation of Illinois
Filed Feb. 12, 1962, Ser. No. 172,555
5 Claims. (Cl. 177—181)

This invention relates to a new and improved bathroom scale construction designed with a view to enabling the purchaser to better adapt the scale to suit the color scheme or motif of the room by a simple change in the appearance of the platform.

Heretofore, the closest the purchaser could come to avoiding having the bathroom scale clash with the decor was to select a scale of a color to match or blend in with the color scheme and, hence, when the room was redecorated in a different color, the scale was usually no longer suitable, and the purchaser might, nevertheless, hesitate to discard it and have to put up with its lack of harmony in the room. It is, therefore, the principal object of my invention to provide a scale in which the platform has a transparent cover piece that is easily removable and replaceable, under which a piece of wallpaper like that used on the wall, or a piece of floor covering like that used on the floor, cut to fit neatly inside the cover piece, may be placed to have the scale take on the same appearance as the wall or the floor, if that is desirable, or a similar piece of paper or cloth having the desired color to match or blend nicely with both the floor and walls could be used in a similar way, this decorative piece being cut away at the window opening in the platform to enable seeing the dial.

The transparent cover piece is preferably molded of clear acrylic plastic material with metallic inserts molded in place therein defining a decorative marginal frame and divider portion on the longitudinal center line as well as a decorative frame around the window opening, and hence it is not necessary to exercise great care in cutting the decorative mat to be inserted under the transparent cover piece, inasmuch as the cut edges are neatly covered up by the metallic frame inserts in the cover piece.

The invention is illustrated in the accompanying drawing in which:

FIG. 1 is a plan view of a bathroom scale embodying my invention, portions of the transparent cover piece being broken away to disclose the decorative mat therebeneath in elevation;

FIG. 2 is a rear view;

FIG. 3 is a partial front view;

FIG. 4 is an exploded perspective view, and

FIGS. 5 and 6 are sectional details on an enlarged scale taken on the lines 5—5 and 6—6 of FIGS. 2 and 3, respectively.

The same reference numerals are applied to corresponding parts throughout the views.

Referring to the drawing, the reference numeral 7 designates a bathroom scale generally embodying my invention, comprising a base 8 over which a platform 9 is supported on a lever mechanism for movement downwardly against the resistance of a weighing tension spring, as illustrated for example in the copending application of Mike A. Provi, Serial No. 731,283, filed April 28, 1958, now Patent No. 3,022,845, the extent of downward movement of the platform 9 under the weight applied to the platform being indicated on a dial 10 in terms of pounds of weight of the person being weighed and reflected by a corresponding amount of turning of the dial 10 relative to an index mark or hairline provided by a wire 11 that is suitably fixed relative to the base 8 and overlies the dial 10, the dial and hairline both being visible through an elliptical window opening 12 in the platform 9, and the numerals 13 on the dial 10 being usually magnified for easier reading from eye level by means of a lens, usually provided in the window opening 12 in the platform, but provided in the present scale construction as an integrally molded, embossed, hollow, oval-shaped portion 14 in the clear acrylic plastic cover piece 15 that fits down neatly over the platform 9. A peripherally knurled hand operable adjusting nut 16 projects forwardly from the front end of the base 8 through a slot 17 provided in the front flange of the platform 9 and is a part of the back-to-zero adjustment for the dial 10, as disclosed in the aforesaid Provi application, such adjustments being well known in this art.

In accordance with my invention the platform 9, which is stamped from sheet metal to provide downwardly extending marginal flanges 18, may be left bare on top or covered, as indicated at 19 in FIG. 4, with a thin layer of uniform thickness polyurethane or felt gasket material for cushioning purposes, the platform 9 being substantially completely concealed under a mat 20 provided for decorative purposes under the transparent cover piece 15. The latter has downwardly extending marginal flanges 21, which reach down farther than the flanges 18 on the platform and carry two laterally spaced inwardly projecting lugs 22 on the rear end of the cover piece, which by engagement with the bottom edge of the flange 18 on the rear end of the platform 9 serve to limit upward displacement of the cover piece 15 when the scale is picked up, these lugs 22 being entered under the rear end of the platform first when assembling the cover piece on the platform. While these lugs might conceivably be molded as integral projections on the rear flange of the cover piece 15, I prefer to have them provided on opposite ends of an elongated thin metal piece 23 that is in the form of an insert in the molding operation. A generally S-shaped leaf spring 24 is provided as a part of another elongated thin metal plate 25, also in the form of an insert in the molding operation on the flange on the front end of the cover piece 15, said flange having a notch 26 for projection therethrough of the leaf spring 24, so that the leaf spring is free to flex relative to the cover piece and latch under the edge of the flange 18 when the front end of the cover piece 15 is swung down over the front end of the platform 9 in assembling the cover piece on the platform, first by engagement of lugs 22 under the rear end, and finally by engagement of the leaf spring latch 24 under flange 18 at the front end. A rectangular opening 27 in the leaf spring 24 affords easy access therethrough to the knurled edge of the nut 16 for back-to-zero adjustment.

In operation, the scale is sold with a mat 20 of a plain design and neutral color, the salesman usually having a number of mats with different designs to demonstrate how by substitution of another mat with a different design and/or color the scale can easily be transformed in appearance to match the decor of a bathroom or bedroom and thus make the scale useful anywhere without clashing and looking out of place. The purchaser quickly realizes that if he or she tires of one mat it is a simple matter to cut another one or two of a different design and/or color to have a change, and many owners get considerable personal satisfaction out of experimenting in this fashion. The mats are easily cut around the edges 28 to fit loosely inside the cover piece 15 and to provide a window opening 29 to register with the window opening 12 in the platform 9 and its covering 19 where one is provided on the platform. Great care is not necessary in the cutting of the mats because a marginal frame 30 of thin metal is molded in place as an insert in the molding of the cover piece 15, thereby concealing the more or less roughly cut edges 28, and there is also a similar thin metal frame 31 molded in place as an insert around the lens 14, thereby covering up the edges of the window opening 29. The frames 30 and 31 are flush with the inner side of the cover piece 15 and, therefore, do a better job of covering up the cut edges at 28 and 29 of the mat.

It is believed the foregoing description conveys a good understanding of the objects and advantages of my invention. The appended claims have been drawn with a view to covering all legitimate modifications and adaptations.

I claim:

1. In a bathroom scale comprising a generally rectangular base and a generally rectangular weighing platform supported on said base for downward deflection under load, said platform being operatively connected with weight indicating means visible through a window opening provided in the platform, whereby the weight of a person standing on the platform is readable through said window, the improvement which consists in the provision of a generally rectangular transparent cover for said platform, and a generally rectangular opaque mat of any desired color and/or design imposed between the platform and cover for ornamentation and decoration purposes, said mat having a window opening provided therein in register with the window opening in said platform, said cover having downwardly projecting marginal flanges on the edges thereof closely enclosing the platform to prevent lateral displacement of said cover and mat relative to said platform, there being a leaf spring latch on one end of said cover projecting inwardly relative to the bottom of said flange to engage under the platform to prevent upward displacement of said cover relative to said platform, said scale including a manually rotatable zero adjusting member connected with the weight indicating means and projecting outwardly from the same end of the base where said leaf spring latch is located, said latch having an opening provided therein through which said adjusting member projects freely for manual operation.

2. In combination with a bathroom scale including a weighing platform supported above a base member; a replaceable decorative platform cover unit comprising, a decorative mat conforming to the outline of said platform and superimposed thereon, and a transparent cover for said platform superimposed on said mat, said cover having depending marginal portions detachably engaging beneath said platform.

3. A combination as defined in claim 2 wherein said transparent cover is provided with depending marginal flange elements on all sides thereof, the depending flange on one side of said cover having a rigid inturned projection engaging beneath the platform, and the depending flange on that side opposed to the rigid projection supporting a movable inturned projection engaging beneath the platform.

4. A combination as defined in claim 2 wherein said transparent cover is provided with depending marginal flange elements on all sides thereof, the depending flange on one side of said cover having a rigid inturned projection engaging beneath the platform, and the depending flange on that side opposed to the rigid projection supporting a resilient spring clip engageable and disengageable beneath said platform.

5. In combination with a bathroom scale including a rectangular weighing platform horizontally supported above a base member with a dial window opening formed in the upper face thereof; a replaceable decorative platform cover unit comprising, an opaque decorative mat conforming to the outline of said platform and having a cut-out portion in registry with the platform dial window, said decorative mat being loosely superimposed on said platform, and a transparent cover for said platform superimposed on said mat, said cover having a raised oval bubble in registry with the dial window opening in said underlying mat, and said cover having depending marginal flange portions detachably engageable beneath said platform.

References Cited in the file of this patent

UNITED STATES PATENTS

| | | |
|---|---|---|
| 262,512 | Toutant | Aug. 8, 1882 |
| 1,987,795 | Rise | Jan. 15, 1935 |
| 2,453,920 | Kysela | Nov. 16, 1948 |
| 2,760,301 | Derr et al. | Aug. 28, 1956 |